2,874,196
METHOD OF CRYSTALLIZING NITRO PRODUCTS

Karl Torvald Norell, Bofors, Sweden, assignor to Aktiebolaget Bofors, Bofors, Sweden, a Swedish corporation No Drawing. Application December 24, 1954
Serial No. 477,591

Claims priority, application Sweden February 11, 1954

11 Claims. (Cl. 260—645)

This invention relates to the preparation of pure isomers of aromatic nitro-compounds, principally di- and trinitro-compounds. It is directed particularly to the crystallization thereof from nitric acid out of crude products containing said nitro-compounds, other isomers, incompletely nitrated material and impurities.

It has been known for a long time that pure 2,4,6-trinitrotoluene, as well as pure m-dinitrobenzene, can be prepared from technical-grade nitration products by a combination of crystallizations from aqueous media and purification with solutions containing sulphite or sulphite-bisulphite. These mainly chemical purification methods have several disadvantages: (a) the success thereof is highly dependent upon the extent of completeness of the nitration in the material treated; (b) a sizable quantity of the originally available nitro-product is converted into a useless waste product; (c) they give rise to hygienic problems in connection with the handling or disposal of waste water that are difficult to control, and (d) they introduce considerable hazards into the manufacture due to the formation of unstable organic compounds in the sulphite treatment.

It is further known that pure isomers of aromatic nitro-compounds, e. g., m-dinitro-benzene, 2,4-dinitrochlorobenzene, 2,4-dinitrotoluene and 2,4,6-trinitrotoluene, in addition to low-melting by-products, if the starting materials are technical-grade nitration products washed to neutrality, can be obtained by crystallization from different solvents, e. g., ethanol, ethanol-benzene, acetone, acetone-ethanol, chlorinated organic solvents, benzene, toluene, nitrobenzene, mononitrotoluene, etc. It is, however, characteristic of these solvents throughout that they are comparatively expensive; and that they require a preliminary washing of the crude product before the crystallization. Furthermore, most of these methods—e. g., the usual crystallization from ethanol-benzene—involve the use of flammable liquids. The presence of the flammable liquids, e. g., in the production of trinitrotoluene, in addition to increasing fire hazards, also cause an incidental, substantial increase in explosion hazards. Methods have been used in the past for crystallizing trinitrotoluene out of concentrated sulphuric acid or spent acids. Such processes, however, involve problems that are very difficult to control in connection with the recovery of the sulphuric acid and the low-melting trinitrotoluene fractions from the crystallization mother liquors. Finally, it is known that pure 2,4,6-trinitrotoluene can be produced from the technical nitration product by crystallizing from a solution in nitric acid.

All the methods described in the literature for carrying out the last-mentioned type of crystallization have implied that the nitric acid must be admixed with the material in sufficient quantity to produce complete dissolution of the trinitrotoluene at the outstart of the crystallization operation. Furthermore, in some cases, such high concentrations of nitric acid have been used that the mother liquor from the nitric acid crystallization still contained dissolved trinitrotoluene components in such amount that these mother liquors could easily be detonated by an explosion. When comparatively large quantities of nitric acid of high concentrations are used, it is also necessary, generally, to dilute the acid mother liquor in order to make it possible to recover nitric acid and low-melting fractions of nitro-compounds. As a consequence, considerable quantities of concentrated nitric acid must be added to the dilute acids in order to increase the concentration thereof before it can be used again to carry out another crystallization.

The method of the present invention is characterized by the fact that (a) the nitric acid is used in moderate concentrations for carrying out the crystallization (55 to 68 percent $HNO_3$), (b) the acid is added in a quantity insufficient to effectuate complete dissolution of the nitro-compounds during any part of the crystallization process. Moreover, the nitro-compounds can be introduced in the nitric acid state as they come from the nitration processes. The small quantities of nitric acid and the low concentrations thereof, make it unnecessary to dilute the acid crystallization mother liquor with water before regeneration. Therefore, the recovery of the nitric acid can be carried on under safe conditions merely by simple distillation or evaporation of the crystallization mother liquor; in this way, the nitric acid is recovered in such a state that, without or with only a slight strengthening, it can be used again for the crystallization process. Other important advantages of the method are: that the solvent used is not flammable; that it is low-priced and readily available in connection with any nitrating plant; and that, in addition to the pure products prepared, there are obtained low-melting fractions having properties that turn them into excellent components for a large number of industrial as well as military explosives.

The method of the instant invention can be carried out advantageously in batch or continuous operation as well as in forms intermediate these operative arrangements.

The following examples are illustrative of the application and principles of the invention; and are not limitative.

Example 1

One part of acidic, molten trinitrotoluene (solidification point 78° C., determined on a neutral and dry sample) having a temperature of approximately 80° C. is introduced simultaneously with one part of 60-percent nitric acid having a temperature of approximately 35° C. into a small-size mixing apparatus where the two liquid streams are vigorous mixed by means of a mechanical stirrer, by which commencement of the crystallization is obtained. From the mixing kettle, the temperature of which is kept at 60° C. by adjusting the temperature of the nitric acid added, the mixture of crystals, acid trinitrotoluene phase and nitric acid phase, is allowed to run continuously via an overflow into a much larger crystallizing apparatus, provided with an anchor stirrer and a cooling and heating jacket, which is successively filled with the crystallization mixture while the temperature is, by cooling or heating, kept at 0° to 4° C. lower than the temperature of the small mixing apparatus just mentioned. When the large crystallizing apparatus becomes completely filled with the crystallization mixture, its temperature is lowered, at first slowly and then more and more quickly, by turning on the cooling water flowing through the jacket so as to bring it down to 30° C. within from 3 to 4 hours. After 30 minutes at this temperature, the emptying of the crystallizer can be started. This may be done by batchwise centrifuging of the contents, or passing them on a suction filter. The individual crystals are washed in the conventional way by adding, first 60 percent nitric acid (15 percent calculated on the crystal weight), and then water (30 percent calculated on the crystal weight). The former washing liquid is combined with the crystallization mother liquor, and the combined solutions are regenerated as has been stated above. The latter washing solution is separately collected for use at the absorption plant necessary for the production of trinitrotoluene. In addition to an almost pure 2,4,6-trinitrotoluene with a solidification point of 80.5° C., and on regeneration of nitric acid solutions, there is obtained a low-melting trinitrotoluene with a solidification point of approximately 35° C. The 35° C. product is obtained in a quantity of 9 to 10 kg. per 100 kg. of 80.5° C. trinitrotoluene.

Example 2

Acid trinitrotoluene with a solidification point of 78° C., determined on a neutral and dry sample, is processed in the same way as described in Example 1 except that approximately ⅕ of the contents of the large crystallizing apparatus is left remaining therein when it is emptied on completion of the crystallization cycle. In so doing, it becomes possible, when refilling the large crystallizer, to keep its temperature at 45–50° C. instead of 55–60° C., so that the subsequent cooling period can be completed in from 2 to 3 hours instead of 3 to 4 hours.

Example 3

The crystallization of trinitrotoluene is mostly carried out as described in Example 1, except that the one, large crystallizing apparatus is replaced by three cooled stirrer apparatus, coupled in series, through which the crystallization mass is continuously run with stepwise lowering of the temperature so that a temperature of approximately 55° C. is attained in the first apparatus; approximately 45° C. in the second, and 30° C. in the third apparatus. From the third apparatus, the slurry of crystals and acid phase is continuously taken off on a suction filter or centrifuged.

Example 4

Crystallization of acid trinitrotoluene (solidification point 78° C. in the neutral, dry state) is conducted in a first group of crystallizing apparatus, mostly in the manner described in Example 3. The trinitrotoluene crystals drawn off on a suction filter or centrifuge, as above stated, have a solidification point of 80.4° C. in the dry, neutral-washed state. The mother liquor and the dilute wash acid combined are subjected to a further crystallization by cooling down to a final temperature of 15° C. in a series of two continuously running apparatus. The secondarily crystallized-out product, which in the neutral-washed, dry state has a solidification point of approximately 70° C., is taken off on a suction filter or centrifuged; whereupon, in the acid state, it is continuously returned to the mixing apparatus described in Example 1 or to the large crystallizer next folowing. The mother liquor from the secondary crystallization step is regenerated to extract 60-percent nitric acid and low-melting trinitrotoluene products in the manner above described. The procedure just described yields low-melting trinitrotoluene products with a solidification point from 30° to 35° C. in a quantity equal to 8 kg. per 100 kg. of 80.4° C. trinitrotoluene.

Example 5

The crystallization is conducted by the method described in Example 4 except that the secondary, approximately 70° C. trinitrotoluene is returned to the mixing apparatus included in the first group of the crystallization process, dissolved in the 60-percent nitric acid which in this apparatus is vigorously mixed with acid 78° C. trinitrotoluene.

Example 6

Nitric-acid dinitrochlorobenzene with a solidification point of 48° C. in the dry, neutral state, is continuously crystallized under conditions described in Example 3 with regard to the apparatus. The crystallization, however, is conducted with 58-percent nitric acid as the solvent and at a temperature in the first crystallizer of approximately 35° C.; in the second approximately 28° C.; and in the third apparatus approximately 20° C. The product is taken off on a suction filter and washed there with 58-percent nitric acid and water. From the mother liquor and wash acid combined there are obtained, in the manner previously mentioned, 58-percent nitric acid and a dinitrochlorobenzene product with a solidification point of 33° C. This product consists almost entirely of 2,4- and 2,6-dinitrochlorobenzene. Calculated on 100 kg. of 48° C. dinitrochlorobenzene, the quantity obtained is approximately 93 kg. of dinitrochlorobenzene, solidification point 49.1° C.; and approximately 6 kg. of 33° C. dinitrochlorobenzene. The latter product can be used for manufacture of the explosive tetryl (N-nitro-N-methyl-2,4,6-trinitroaniline).

Example 7 m-Dinitrobenzene, solidification point 89.1° C. in the neutral, dry state, is prepared under conditions analagous to those described in Example 1, by the crystallization of nitric-acid dinitrobenzene with a solidification point of 83° C. in the neutral, dry state. As the solvent, there is used 61 percent $HNO_3$ in a quantity of 1.1 parts per 1 part of acid 83° C. dinitrobenzene. The crystallization is carried out between the initial temperature of 60° C. and the final temperature of 30° C. In addition to m-dinitrobenzene with a solidification point of 89.1° C., there is obtained a dinitrobenzene product with the solidification point of 55° C. in a quantity equal to 18 kg. per 100 kg. of the pure product.

In carrying out the procedure of this invention with regard to trinitrotoluene, it has been found that the dilute nitric acid, preferably having a concentration of 55 percent to 68 percent, and insufficient completely to dissolve the nitro product, should be used in the proportion of from ⅔ to 1½ parts of the dilute nitric acid to one part of the nitro product; further, the initial temperature of the mixture of the nitro product and the dilute nitric acid should not exceed 62° C.; and the subsequent cooling thereof should be carried out until a temperature of 20° C. is attained. The initial temperature of the mixture should preferably not exceed 60° C. and the mixture should preferably not be cooled lower than 30° C.

It will be understood that the foregoing description of the invention and the examples set forth are merely illustrative of the principles thereof. Accordingly, the appended claims are to be construed as defining the invention within the full spirit and scope thereof.

I claim:

1. Method of crystallizing a mononuclear aromatic nitro product which comprises forming an emulsion of said product in liquid form in dilute nitric acid, the nitric acid constituting the continuous phase, and slowly decreasing the temperature of said emulsion whereby the nitro product crystallizes out, and the impurities enter the continuous phase, and separating said crystals from the continuous phase.

2. Method in accordance with claim 1 wherein the mononuclear aromatic nitro-products are dinitro compounds.

3. Method in accorddance with claim 1 wherein the mononuclear aromatic nitro-products are trinitro compounds.

4. Method in accordance with claim 1 wherein secondary crystallization fractions are returned in crystal form to earlier stages of the crystallization process.

5. Method in accordance with claim 1 wherein secondary crystallization fractions are returned in the form of nitric acid solutions to earlier stages of the crystallization.

6. Method in accordance with claim 1 wherein secondary crystallization fractions are returned in crystal form to the initial stage of the crystallization process.

7. Method in accordance with claim 1 wherein secondary crystallization fractions are returned in the form of nitric acid solutions to the initial stage of the crystallization process.

8. Method of crystallizing a mononuclear aromatic nitro compound which comprises forming an emulsion of said product in liquid form in dilute nitric acid, the nitric acid constituting the continuous phase and having a concentration of about 55 to 68 percent, the proportion of the nitro product to the dilute nitric acid being about 1 to about ⅔ to 1½ parts of the acid, and slowly cooling the emulsion whereby the pure nitro product crystallizes out, and separating the crystals from the continuous phase.

9. Method in accordance with claim 8 wherein the initial temperature of the emulsion is not in excess of about 60° C. and the final temperature is not less than about 30° C.

10. Method in accordance with claim 8 wherein the nitro product is trinitro toluene.

11. Method in accordance with claim 8 wherein the nitro product is dinitro toluene.

References Cited in the file of this patent

Morton: Laboratory Technique in Organic Chemistry, 1938, pp. 161–162.